United States Patent [19]
Johnson

[11] Patent Number: 5,727,803
[45] Date of Patent: Mar. 17, 1998

[54] ADAPTOR FOR ATTACHMENT OF A TRAILER TO A THREE POINT HITCH

[76] Inventor: Alan Johnson, HCR 77 Box 17, Trail City, S. Dak. 57657

[21] Appl. No.: 641,055

[22] Filed: Apr. 29, 1996

[51] Int. Cl.⁶ ............................................. B60D 1/26
[52] U.S. Cl. ............................................. 280/416.2
[58] Field of Search .................... 280/416.1, 416.2, 280/416.3, 4.9, 433, 441, 442, 453, 478.1, 508, 510, 460.1, 415.1, 515

[56] References Cited

U.S. PATENT DOCUMENTS

| | | | |
|---|---|---|---|
| 4,431,207 | 2/1984 | Lagenfeld et al. | 280/415 A |
| 4,773,666 | 9/1988 | Koberlein et al. | 280/460 A |
| 4,850,789 | 7/1989 | Zimmerman | 280/416.2 |
| 5,169,279 | 12/1992 | Zimmerman | 280/416.2 |
| 5,211,416 | 5/1993 | Blacklaw | 280/416.1 |
| 5,261,687 | 11/1993 | Bergman | 280/478.1 |

*Primary Examiner*—Stephen Avila
*Attorney, Agent, or Firm*—Jacobson & Johnson

[57] ABSTRACT

An adaptor for a three point hitch of a tractor allows the adaptor to attach to the hitch bar of a trailer without the necessity of vertical or horizontal adjustment of the position of the tractor relative to the trailer. The adaptor comprises a vertical post having an upper end attached to a centre arm of the three point hitch. A pair of side arms of the adaptor attached to the lower arms of the three point hitch. A J-shaped hook member has a longer leg projecting through a slot in the post and a shorter leg which abuts against a rear face of the post in the hitching position. The hook engages around a loop attached to the trailer. A cylinder coupled to a forward end of the longer leg can actuate pivotal movement of the hook about a pin attached across the post to move the hook from the hitching position to a release position.

8 Claims, 3 Drawing Sheets

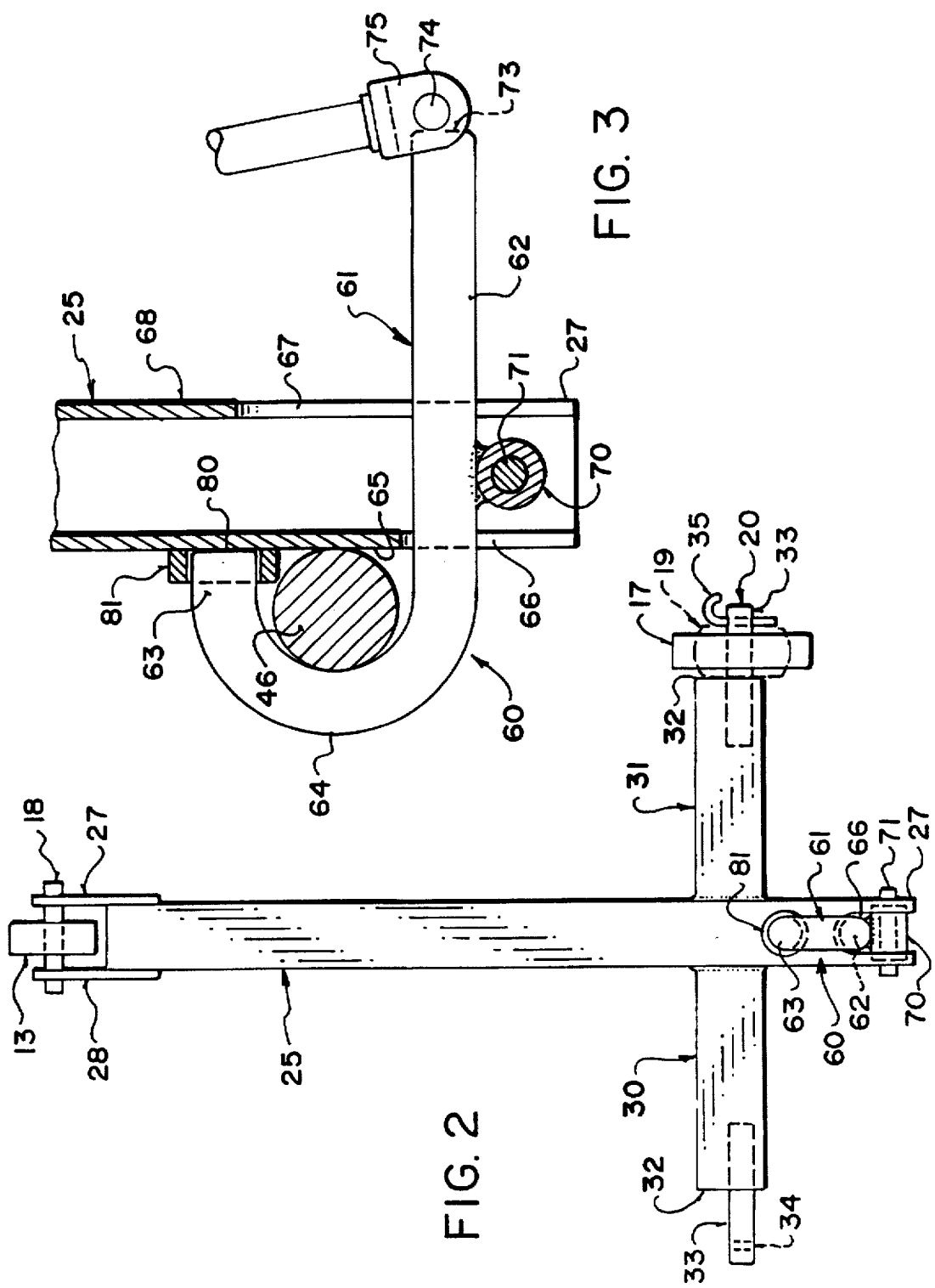

ADAPTOR FOR ATTACHMENT OF A TRAILER TO A THREE POINT HITCH

BACKGROUND OF THE INVENTION

This invention relates to a hitch apparatus for attachment of a trailer to a three point hitch of a tractor, the three point hitch comprising a pivotal centre upper arm, a pair of lower arms arranged each on a respective side of the centre arm and lift means for raising and lowering the lower arms.

One advantage of attachment of the hitch adaptor to the three point hitch of the tractor is that the three point hitch can be actuated to effect vertical movement of the adaptor relative to the trailer to properly align vertically the adaptor relative to the trailer without necessity for movement of the tractor or the trailer itself.

One example of an arrangement of this type is shown in U.S. Pat. No. 4,431,207 (Langenfeld) which includes a vertical pin along a front face of a post attached to the three point hitch with that pin being actuable by a cylinder to engage through holes in the device at the front of the hitch of the trailer. This arrangement is however relatively complex and requires accurate side to side alignment of the tractor relative to the hitch.

Other examples of trailer hitches are shown in U.S. Pat. Nos. 5,261,687 (Bergman), 5,427,399 (Olson); 5,193,838 (Olson); 4,773,666 (Koberlein) and 4,225,149 (Koopman). All of these devices show various arrangements for connecting an attachment to the front of the trailer to the tractor and to various extents avoid the necessity for transverse movement of the tractor relative to the trailer to enable effective coupling.

SUMMARY OF THE INVENTION

It is one object of the present invention, therefore, to provide an improved hitch apparatus which is of simple construction and enables a three point hitch to be connected to a trailer while avoiding the necessity for transverse movement of the trailer relative to the tractor.

According to one aspect of the invention there is provided a hitch apparatus for attachment of a trailer to a three point hitch of a tractor, the three point hitch comprising a pivotal centre upper arm, a pair of lower arms arranged each on a respective side of the centre arm and lift means for raising and lowering the lower arm; the apparatus comprising: an upright post member; first attachment means at an upper end of the post member for mounting on an outer end of the centre arm; two side mount members each projecting out to a respective side of the post member and having second attachment means thereon for mounting on an outer end of a respective one of the lower arms; a hitch coupling for mounting on a hitch bar of the trailer and including a loop member lying in a horizontal plane and forming a horizontal front bar portion transverse to the hitch bar; a hitch engagement member mounted on a post member and comprising a J-shaped hook portion projecting rearwardly from a rear face of the post member including a longer leg and a shorter leg lying in a vertical plane so as to receive the bar portion within the hook portion between the legs in a hitching position; the longer leg extending through the post member and being pivotally mounted thereon for pivotal movement of the hook portion about a horizontal axis at right angles to the plane of the hook portion; and actuating means connected between a forward end of the longer leg and the post for actuating pivotal movement of the hook portion between the hitching position and a release position.

One embodiment of the invention will now be described in conjunction with the accompanying drawings in which:

BRIEF DESCRIPTION OF THE DRAWINGS

FIG. 2 is a rear elevational view of the adaptor with the trailer omitted.

FIG. 3 is a vertical cross sectional view through a centre line of the adaptor showing only the lower part thereof.

In the drawings like characters of reference indicate corresponding parts in the different figures.

DETAILED DESCRIPTION

Figure 1:
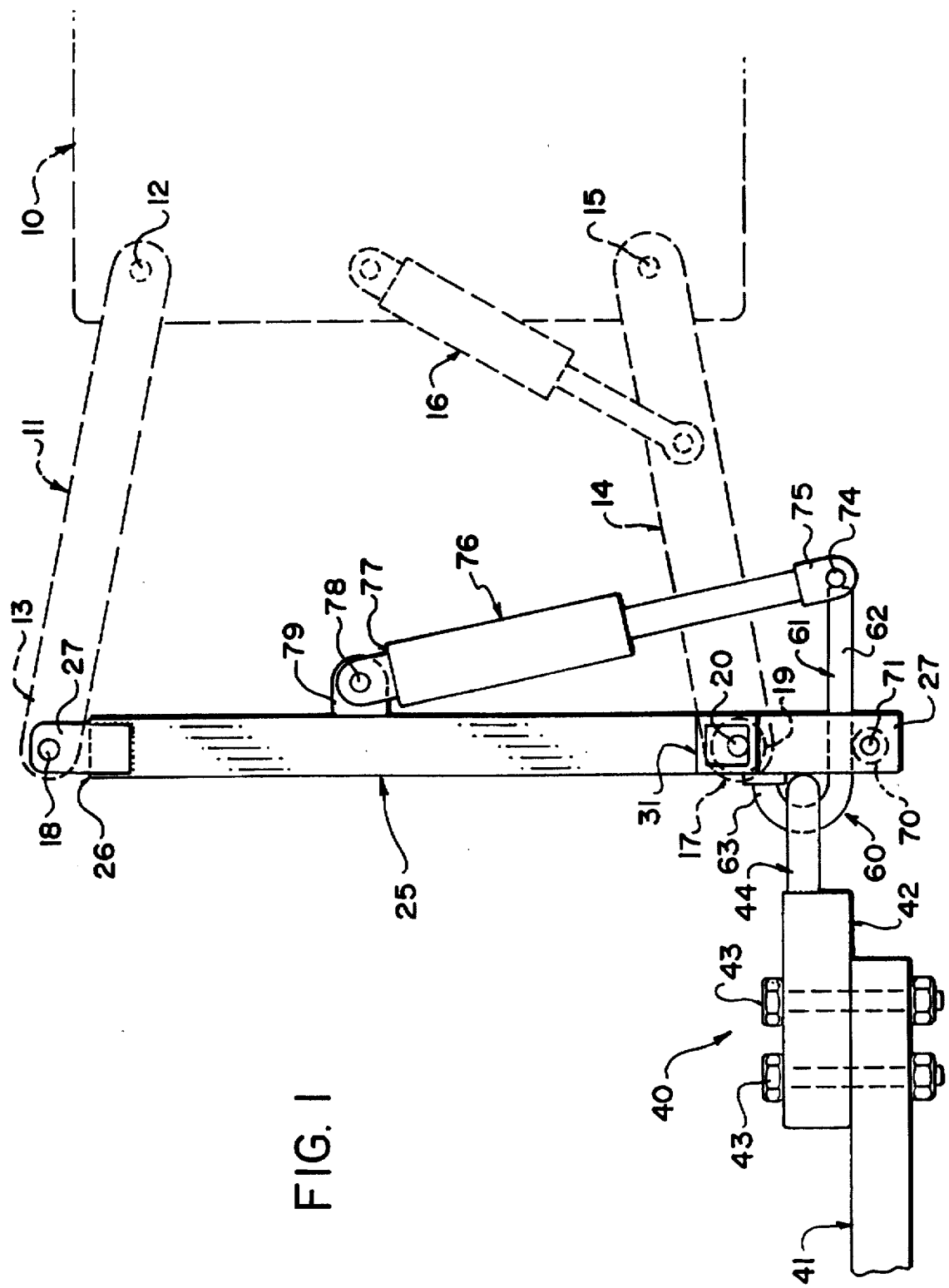
FIG. 1 is a side elevational view of a three point hitch, the adaptor of the present invention attached to the three point hitch and a forward part of a trailer connected to the adaptor.

A tractor is schematically indicated at 10 in FIG. 1 and includes a conventional three point hitch including a central upper arm 11 pivotally connected to the tractor at a pin 12 and having a rear end 13 for attachment to an element to be carried on the three point hitch. The three point hitch further includes two lower arms 14 each of which is pivotally mounted on a pin 15 on the tractor and each arm can be lifted by a cylinder 16 connected between the tractor and a point on the arm spaced inwardly of an outer end 17 of the arm. The outer end is again arranged for attachment to an implement to be carried by the three point hitch.

The outer end 13 of the centre arm has a transverse hole for receiving a pin 18 of the implement. The outer ends 17 include a spherical bearing member 19 which has a central hole for receiving a pin 20, the bearings 19 allowing rotation or pivoting movement of the implement in a side to side direction in conventional manner.

The hitch apparatus or adaptor of the present invention comprises a vertical post 25 formed from a square tube and extending from an upper end 26 to a lower end 27 formed of a continuous portion of the tube. At the upper end 26 is welded a pair of flanges each on a respective side surface of the tube 25 and standing upwardly from the upper end 26 to define a clevis through which the pin 18 extends. The clevis defined by the flanges 27 and 28 therefore attaches the upper end of the post to the arm 11.

On each side of the post 25 is mounted a respective one of a pair of side projections 30 and 31 each in the form of a portion of the same tube which is welded at its inner end to a side wall of the post so as to extend outwardly therefrom at right angles thereto. Each side projecting member 30, 31 extends to an outer end 32 at which is mounted a horizontal pin 33 which is welded inside the end of the tube to a bottom wall of the tube and projects outwardly beyond the end 32 of the tube. The pin 33 is cylindrical and defines a coupling pin 20 for engaging through the bearing 19 of the lower arms 14 of the three point hitch. A vertical bore 34 in the pin 33 receives a lock pin 35 to hold the pin 33 in place on the lower arm 14.

The side projecting members 30 and 31 are spaced from the lower end 27 of the post 25 and have a length sufficient to accommodate the width of the three point hitch of conventional construction.

The apparatus further includes a coupling 40 which is mounted on a hitch bar 41 of a trailer. The coupling 40 comprises a bar portion 42 bolted to the hitch bar 41 by bolts 43 and a loop 44 welded to a front end of the bar 42. The loop 44 lies in a horizontal plane with two side portions 45 and a horizontal transverse front portion 46 which lies at right angles to the direction of movement of the trailer when trailed. The loop is formed from a metal rod which is bent to define basically an annular loop with a space between the sides 45 which is greater than the diameter of the rod forming the loop. There is also a space between the rear of the front bar 46 and the front of the bar 42 which is greater than the thickness of the rod forming the loop.

Figure 4:
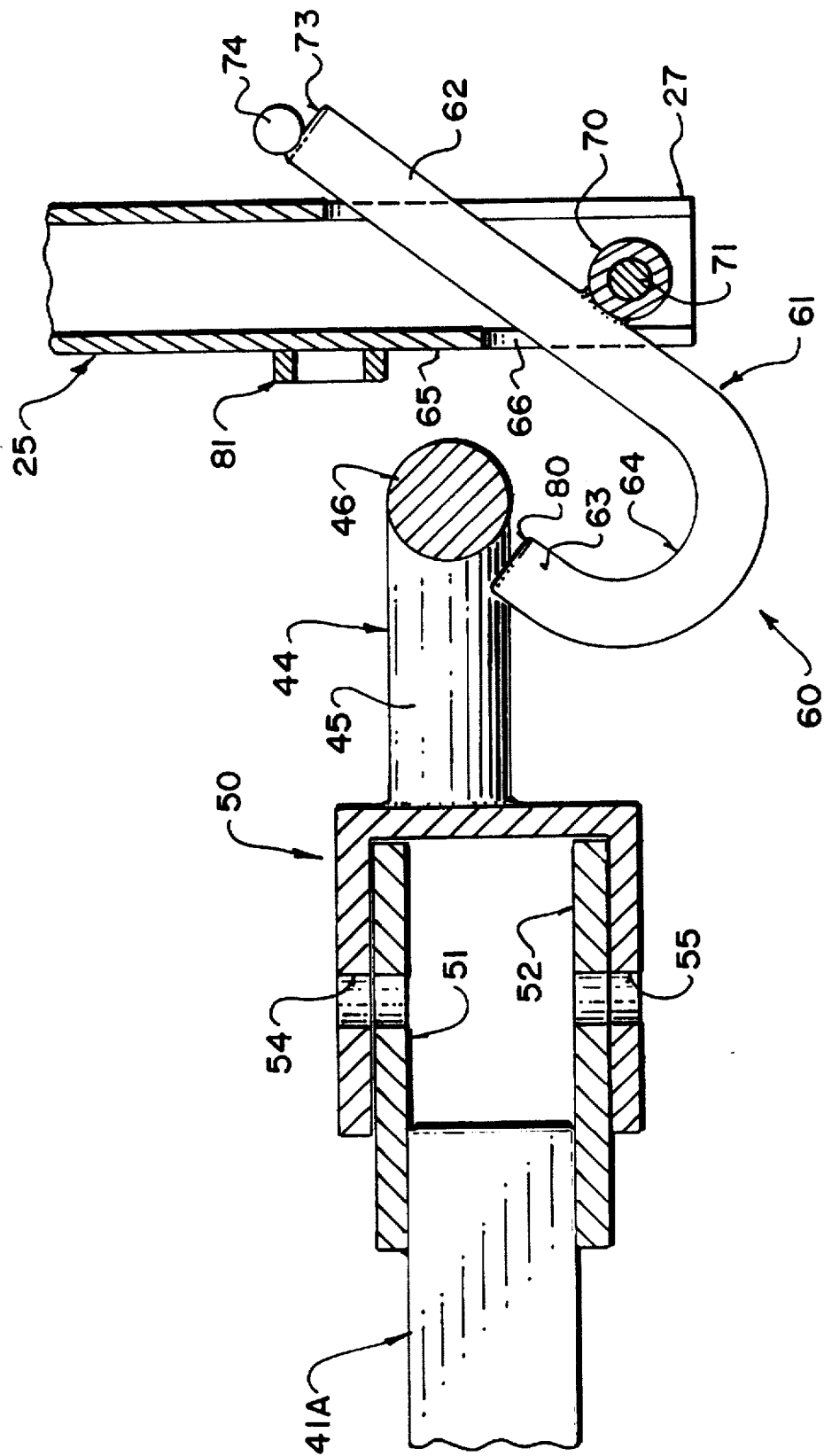
FIG. 4 is a similar vertical cross sectional view to that of FIG. 3 showing the adaptor in the release position.

In FIG. 1 the bar 42 is simply bolted to the top surface of the hitch bar 41. In FIG. 4 is shown a modified arrangement in which the same loop 44 is attached to a sleeve 50 which engages over a pair of flanges 51 and 52 forming a clevis at the front of the hitch bar 41A. The sleeve has a pair of aligned holes 54 and 55 which cooperate with holes in the flanges 51 and 52 to receive a locking pin.

The post carries a hitch engagement member generally indicated at 60. This comprises a J-shaped hook 61 with a longer leg 62 and a shorter leg 63 defining therebetween a curved section 64. The hook including the longer and shorter legs is mounted in a vertical plane so that the curved section 64 can engage around the front bar 46 to hook the front bar against a rear face 65 of the post 25. The hook 61 is mounted in a slot 66 in the front face 65 and in the second slot 67 in the rear face 68 of the post 25. The slot has a width less than the width of the front and rear faces. The height of the slot is such that the slot is higher in the rear wall 68 so as to accommodate the movement of the hook as shown by comparison of FIGS. 3 and 4. The hook 61 is welded to a pipe or sleeve 70 mounted on a pin 71 with the pin extending across the post and projecting through the two side walls of the post. The sleeve or pipe is thus supported by the pin and extends across the full width of the post on the inside surface thereof. An outside surface of the pipe 70 is welded to a bottom surface of the longer leg 62 of the hook 61 so as to hold the hook in position in the slot while allowing the hook to pivot by rotation of the pipe around the pin 71.

The length of the longer 62 is arranged so that a rear end 73 of the longer projects rearwardly from the rear face 68 of the post. A transverse pin 74 is welded at the rear end 73 at right angles to the length of the leg 62 and receives a clevis 75 of a hydraulic cylinder 76. The cylinder is attached at the base end of the cylinder portion 77 by a clevis 78 to a flange 79 welded on the rear face of the post. The piston end of the cylinder carries the clevis 75 which is attached to the pin 74.

Actuation of the cylinder 76 can thus move the hook 61 from the hitching position shown in FIG. 3 to the release position shown in FIG. 4.

In the hitching position shown in FIG. 3, the longer leg 62 is horizontal and the shorter leg 63 has an end face 80 which is immediately adjacent or in contact with the front face 65 of the post. In addition for further stability of the hook in the hitching position, a sleeve 81 is welded to the rear face 65 in a position to surround the end 80 of the shorter leg 63 and thus prevent any side to side movement of the leg 63 when in the hitching position. The length of the leg 63 is arranged relative to the diameter of the cross bar 46 so that the cross bar is closely surrounded by the curved portions 64 of the hook and by the rear face 65 of the post.

The hook can be moved from the hitching position toward the release position shown in FIG. 4 simply by retraction of the cylinder 76 thus pulling the forward end of the leg 62 upwardly to pivot the hook around the pin 71 to release the cross bar 46. In this release position, the hitch can be reengaged simply by moving the tractor to a position adjacent the hitch bar of the trailer, by moving the three point hitch vertically to the required height so that the end of the shorter leg of the hook is just below the cross bar 46 as shown in FIG. 4 and then by actuating the cylinder to pull the leg 63 upwardly behind the cross bar 46 and to pull the cross bar 46 toward the rear face of the post.

As the spacing between the sides 45 of the loop 44 are greater than the thickness of the hook 61, the hook can engage at different positions across the width of the cross bar 46 without the necessity of adjusting the trailer or the tractor relative to the other in a horizontal direction.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A hitch apparatus for attachment of a trailer to a three point hitch of a tractor, the three point hitch comprising a pivotal centre upper arm, a pair of lower arms arranged each on a respective side of the centre arm and lift means for raising and lowering the lower arm; the apparatus comprising:

an upright post member;

first attachment means at an upper end of the post member for mounting on an outer end of the centre arm;

two side mount members each projecting out to a respective side of the post member and having second attachment means thereon for mounting on an outer end of a respective one of the lower arms;

a hitch coupling for mounting on a hitch bar of the trailer and including a loop member lying in a horizontal plane and forming a horizontal front bar portion transverse to the hitch bar;

a hitch engagement member mounted on a post member and comprising a J-shaped hook portion projecting rearwardly from a rear face of the post member including a longer leg and a shorter leg lying in a vertical plane so as to receive the bar portion within the hook portion between the legs in a hitching position;

the longer leg extending through the post member and being pivotally mounted thereon for pivotal movement of the hook portion about a horizontal axis at right angles to the plane of the hook portion;

and actuating means connected between a forward end of the longer leg and the post for actuating pivotal movement of the hook portion between the hitching position and a release position.

2. The apparatus according to claim 1 wherein the lower leg is horizontal in the hitching position and the shorter leg is positioned above the lower leg in the hitching position.

3. The apparatus according to claim 1 wherein the shorter leg is positioned such that an end thereof is immediately adjacent the rear face of the post member in the hitching position.

4. The apparatus according to claim 3 including a receptacle on the rear face of the post member surrounding the end of the shorter leg.

5. The apparatus according to claim 1 wherein the actuating means comprises a cylinder mounted on the front face of the post member and extending vertically therealong.

6. The apparatus according to claim 1 wherein the hook portion in the hitching position defines a space between the hook portion and the rear face of the post member which is substantially equal to the width of the front bar portion.

7. The apparatus according to claim 1 wherein the post member comprises a tube and wherein the longer leg of the hook portion is mounted in the slot formed vertically in the tube.

8. The apparatus according to claim 7 wherein the longer leg is mounted on a sleeve carried on a pin at right angles to the length of the longer leg, the sleeve being positioned inside the tube and extending across a width thereof.

* * * * *